US008860942B1

(12) United States Patent
Ewing et al.

(10) Patent No.: US 8,860,942 B1
(45) Date of Patent: Oct. 14, 2014

(54) APPARATUS FOR MULTI-SPECTRAL IMAGING OF POINT EVENT DETECTION (75) Inventors: William S. Ewing, Stow, MA (US); Mohammad I. Vakil, Shrewsbury, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 770 days.

(21) Appl. No.: 13/097,646

(22) Filed: Apr. 29, 2011

(51) Int. Cl.
*G01N 21/25* (2006.01)

(52) U.S. Cl.
USPC .......................................................... 356/419

(58) Field of Classification Search
USPC .................................... 356/416, 419; 359/722
See application file for complete search history.

(56) References Cited

U.S. PATENT DOCUMENTS

| | | | |
|---|---|---|---|
| 4,519,707 A | 5/1985 | Kuffer | |
| 4,996,427 A * | 2/1991 | Noble et al. | 250/332 |
| 5,276,321 A | 1/1994 | Chang et al. | |
| 5,402,227 A | 3/1995 | Schuma | |
| 5,587,784 A | 12/1996 | Pines et al. | |
| 5,729,011 A * | 3/1998 | Sekiguchi | 250/226 |
| 5,760,899 A | 6/1998 | Eismann | |
| 5,781,336 A | 7/1998 | Coon et al. | |
| 5,926,283 A | 7/1999 | Hopkins | |
| 5,929,985 A | 7/1999 | Sandison et al. | |
| 6,205,272 B1 | 3/2001 | O'Rourke et al. | |
| 6,211,906 B1 | 4/2001 | Sun | |
| 6,215,597 B1 | 4/2001 | Duncan et al. | |
| 6,747,738 B2 | 6/2004 | Knapp | |
| 6,825,930 B2 | 11/2004 | Cronin et al. | |
| 6,856,466 B2 * | 2/2005 | Tocci | 359/663 |
| 6,935,757 B1 | 8/2005 | Mooney et al. | |
| 6,982,743 B2 | 1/2006 | Danilidis et al. | |
| 7,019,777 B2 | 3/2006 | Sun | |
| 7,155,354 B1 | 12/2006 | Mooney | |
| 7,177,085 B2 | 2/2007 | Tocci et al. | |
| 7,248,359 B2 | 7/2007 | Boege | |
| 7,298,497 B2 | 11/2007 | Millerd et al. | |
| 7,317,535 B2 | 1/2008 | Cheben et al. | |
| 7,609,381 B2 | 10/2009 | Warren | |
| 2002/0097388 A1 | 7/2002 | Raz | |
| 2003/0081183 A1 | 5/2003 | Barnhurst | |
| 2004/0114211 A1 | 6/2004 | Trepagnier et al. | |
| 2005/0052755 A1 * | 3/2005 | Lawson et al. | 359/722 |
| 2005/0276462 A1 | 12/2005 | Silver et al. | |
| 2006/0274431 A1 * | 12/2006 | Wood et al. | 359/722 |
| 2007/0116331 A1 | 5/2007 | Rowe et al. | |
| 2008/0048102 A1 | 2/2008 | Kurtz et al. | |
| 2009/0225433 A1 | 9/2009 | Tocci | |
| 2009/0244717 A1 | 10/2009 | Tocci | |

\* cited by examiner

*Primary Examiner* — Kara E Geisel
(74) *Attorney, Agent, or Firm* — AFMCLO/JAZ; Charles Eiger, Jr.

(57) ABSTRACT

A multi-spectral system characterizes point events and other rapidly-occurring events by filtering spectral bands from a point event to form spectral diagrams of the event.

14 Claims, 4 Drawing Sheets

APPARATUS FOR MULTI-SPECTRAL IMAGING OF POINT EVENT DETECTION

RIGHTS OF THE GOVERNMENT

The invention described herein may be manufactured and used by or for the Government of the United States for all governmental purposes without the payment of any royalty.

BACKGROUND

Figure 1:
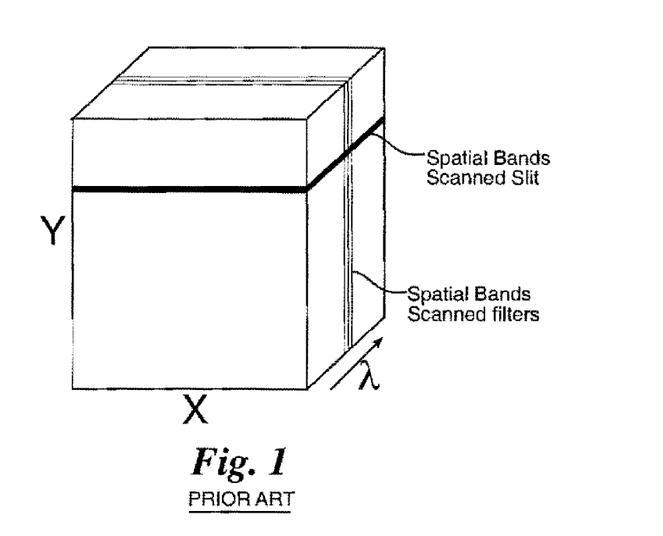
FIG. 1 is a known hyper/multi-spectral imaging data cube.

In the field of imaging, spectral imaging provides a way to qualify the spatial and spectral characteristics of a scene within a field of view. Spectral imaging may be used to detect such as point threats that are dynamic in nature, and which occur and evolve rapidly in time with respect to their environment. An example of this kind of detection could be the observation of an explosion from a great distance as from an airborne platform or space. Various devices are used to provide spectral imaging of an event from a scene on a single detector or an array of detectors. Imaging spectrometers can be scanning devices or spatially multiplexing imagers that scan a slit over the entire field of view of the sensor to acquire the complete image. In this case, the sensor is a modification of a prism or a grating spectrometer requiring a two dimensional detector at its output. The output of the scanned slit instrument is a two dimensional image from the detector where one dimension is spectral information and the second dimension is spatial information. A full image is created by sweeping the scene under view with the scanning slit to obtain the second spatial dimension on a line by line basis. The data product from this spectral imager is a three dimensional cube possessing two spatial dimensions and one spectral dimension. Another option is spectrally filtered imaging. Generally, these devices entail acquiring one spectral band per image until the required number of filtered images "n" is scanned to complete the covered spectrum. FIG. 1 shows a spectral data cube produced from such a system where there are "n" number of images covering "n" spectral bands. In the case of multispectral systems, there are band pass filters for each spectral band. In addition to generating large quantities of data for analysis, these devices can miss rapidly changing spectral features in any band (or bands) since only one color is collected per frame. Scanned slit systems can miss a rapidly evolving event entirely if the event duration is less than a frame time and/or the scan slit is not covering the event area in its field of view when the event occurs. This situation could occur with gunfire or other rapidly-occurring point events.

Spectral imaging, whether multi-spectral or hyper-spectral, generally involves determining the spectral and spatial characteristics of a scene in the field of view of an imaging system or sensor. An imaging sensor or imaging spectrometer includes an optical system that provides images of its field of view in various spectral bands, so that for "n" bands or "n" channels (the terms "channels" and "bands" are used interchangeably) there will be the same number "n" of two-dimensional images completing a data-cube. These devices have the capability of acquiring a large amount of spectral data with high frame rates over a field of view. In addition to the fact that the large amount of spectral data requires greater processing capacity for analysis, the optical front-ends of many of these spectrometers include complex optics that have optics with mechanical parts and/or may require precision alignment. To retrofit one of these optical front-end devices onto existing munitions and imagers is extremely difficult, cost prohibitive, and in some cases impossible due to the size and weight constraints. Other multi-spectral imaging devices use rotating filters that only record a single image at a time or use a plurality of imaging and detection systems that cannot image an event onto a single detector array. Traditional multi- or hyper-spectral imagers process tens or hundreds of spectral bands that produce responses of varying amplitude and shape relative to a particular threat or a set of threats. Processing all of these bands is challenging and requires greater hardware capacity and time to process the data. It also is more prone to errors due to the output response of various sources that may be present in the field of view and that may amplify or attenuate the signal of the event being detected. This situation results in false alarms or missed targets due to the above mentioned artifacts.

Another option is developing new imagers. However, in addition to the cost and complexity factors of designing such devices, the data processing requirements will add time and expense to the data analysis hardware of the existing munitions and imagers. The "n" channels will produce "n" images and the signal processing algorithms will analyze the spectral contents of each channel to determine if the dynamic point like source is a threat or a benign event.

As a result, a need exists for an imaging device that can i) rapidly and reliably characterize and analyze spectral data in its field of view, particularly spectral data of point events that are small and discrete relative to the field of view scanned by the imager, ii) do so without requiring moving parts, constant precision alignment in the field of view, or maintenance of an out of field view, and iii) be retrofitted onto existing imagers to provide a persistent wide field of view capability for multispectral detection of point events without being cost prohibitive.

SUMMARY OF INVENTION

The disclosed multi-spectral apparatus and method overcome these problems and limitations. Through the use of aperture division multiplexing, they use a segmented aperture having surfaces with different orientations and different filter coatings to produce spectral diagrams of different spectral bands or spots produced by a point event. The use of faceted surfaces disposed at different orientations separates the different spectral bands of an event spatially in the imaging plane.

A multi-spectral system for detecting a point event comprises: a multi-faceted lens having two or more side sections and a center section, wherein each side section is coated with a material that filters a particular spectra of radiation from radiation emitted by a point event; a focusing lens disposed on an optical axis extending from an emergent side of the multi-faceted lens to focus radiation emerging from the multi-faceted lens onto a focal plane; and a detector positioned on the focal plane to detect any radiation that emerges from a side section of the multi-faceted lens and is focused on the focal plane.

A computer readable medium comprising computer executable instructions for execution by a processing system, the computer executable instructions for characterizing a point event based on radiation emitted by the point event comprises: instructions that sample a detector at a prescribed frame rate to detect the presence and energy level of different spectra of radiation on the detector; instructions that create a spectral diagram of the spectra of radiation that were detected on the detector; and instructions that compare the spectral diagrams and the different spectra of radiation detected on the detector to spectral diagrams and spectral data of known point events and characterize the point event based on the comparison.

A method of characterizing a multi-spectral event comprising the steps of: detecting radiation from a multi-spectral event with a multi-faceted lens that produces "n" copies of the radiation where "n" corresponds to the number of side sections and the center section of the lens; filtering different spectra of radiation through each side section; focusing the different spectra of radiation on a focal plane to form a spectral diagram of the different spectra of radiation; sampling the spectral diagram and the different spectra of radiation; and comparing the sampled spectral diagram and spectral radiation to spectral diagrams and spectral data of known point events to characterize the point event.

DETAILED DESCRIPTION

Figure 2:
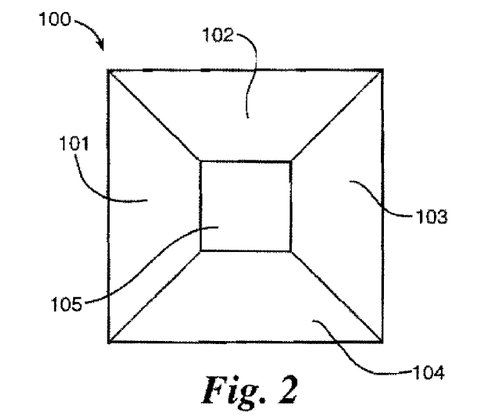
FIG. 2 is a front view of a multi-spectral lens.
Figure 3:
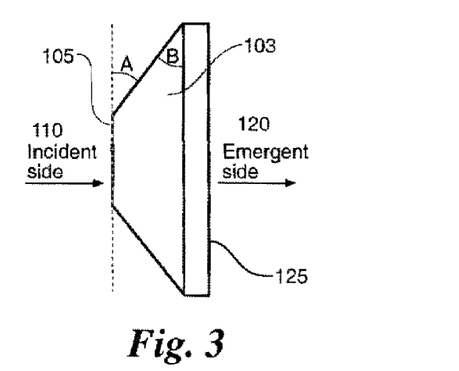
FIG. 3 is a side view of the multi-spectral lens of FIG. 2.

As shown in FIGS. 2 and 3, a multi-spectral prism-lens 100 includes an incident side 110 and an emergent side 120. The incident side 110 comprises four side sections 101, 102, 103, 104 and a center section 105. The emergent side 120 has a planar surface 125. The surfaces of the side sections 101, 102, 103, 104, and the center section 105 are planar. The surface of each side section 101, 102, 103, 104 is disposed at an angle of incline "A" with respect to the surface of the center section 105. The angle of incline "A" may be the same or different for each side section 101, 102, 103, 104. If the surface of the center section 105 is parallel to the surface 125 of the emergent side 120, as shown in FIGS. 2 and 3, the angle of incline "A" of each side section 101, 102, 103, 104 equals the angle of decline "B" of each side section 101, 102, 103, 104 with respect to the surface 125 of the emergent side 120. If the surface of the center section 105 is parallel to the surface 125 of the emergent side 120, radiation that strikes the lens 100 from a direction that is perpendicular to the center section 105, passes through the center section 105 with little or no deviation to the emergent side 120. The side sections 101, 102, 103, 104 and the center section 105 may be any shape or configuration. Different angles of incline "A" may be used for one or more of the side sections 101, 102, 103, 104 to produce different dispersion patterns or diagrams of the spectral bands of radiation that are refracted through the side sections 101, 102, 103, 104 onto a focal plane or detector. The lens 100 may be made of an optical material that is a low or zero dispersion material. The lens 100 uses the refractive nature of the material to produce multiple views of an object or a scene. In the case of point events, the lens 100 produces multiple bands of the radiation emitted by the point event. Each side section 101, 102, 103, 104 and the center section 105 can be coated with a different material that filters a particular wavelength or a spectral band of interest so the multi-spectral lens 100 filters different spectral bands of a point event. If the center section 105 is uncoated, it produces a total spectral band of a point event. Depending upon the refractive material used for the lens and the coatings, the lens can filter and refract radiation in the visible spectra and/or any other spectra of radiation.

Figure 4:
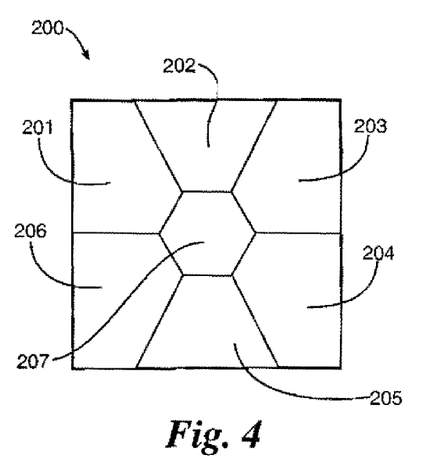
FIG. 4 is a front view of another multi-spectral lens.
Figure 5:
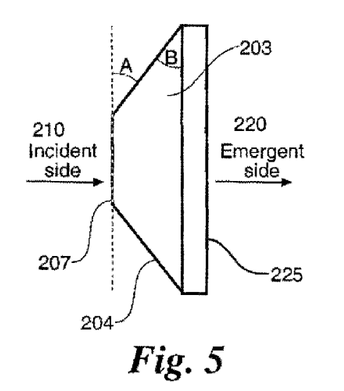
FIG. 5 is a side view of the multi-spectral lens of FIG. 4.

FIGS. 4 and 5 show another multi-spectral lens 200. The lens 200 has an incident side 210 and an emergent side 220. The incident side 210 comprises six side sections 201, 202, 203, 204, 205, 206 and a center section 207. The surfaces of the side sections 201, 202, 203, 204, 205, 206 and the center section 207 are planar. The emergent side 220 comprises a planar surface 225. Each surface of the side sections 201, 202, 203, 204, 205, 206 is disposed at an angle of incline "A" with respect to the surface of the center section 207 and at an angle of decline "B" with respect to the surface 225 of the emergent side 220. If the surface of the center section 207 is parallel to the surface of the emergent side 220, as shown in FIGS. 4 and 5, the angle of incline "A" equals the angle of decline "B". The side sections 201, 202, 203, 204, 205, 206 and the center section 207 may be any shape or configuration. The angle of incline "A" may be the same or different for each side section 201, 202, 203, 204, 205, 206 to produce different dispersion patterns of radiation that is refracted by each side section 201, 202, 203, 204, 205, 206. Each side section 201, 202, 203, 204, 205, 206 and the center section 207 can coated with a different material and filter different wavelengths or spectra of radiation from a point event. The lens 200 can include a different number of side sections, as desired, to filter the desired number of spectral bands for a point event or other event.

Figure 6:
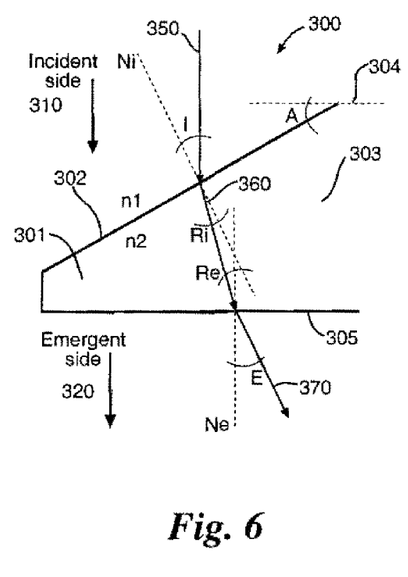
FIG. 6 shows a ray path through a side section of a multi-spectral lens.

FIG. 6 shows a ray path refracted through a side section 301 of a multi-faceted lens 300 such as, for example, the lenses 100, 200 disclosed in FIGS. 2-5, or other multi-faceted lens. As shown in FIG. 6, the ray 350 is refracted 360 as it passes through the side section 301. The refracted ray 360 is refracted again as it emerges 370 from the rear surface 305 of the lens 300 to the emergent side 320. The ray path shows the refraction of the ray 360 through the side section 301. The surface 302 of the side section 301 forms an angle of incline "A" relative to the surface 304 of the center section 303. The angle of incline "A" may be the same or different for each side section of the lens 300. The incident ray 350 forms an angle "I" with a line Ni that extends perpendicularly from the surface 302 of the side section 301. The emergent ray 370 forms an angle "E" with a line Ne that extends perpendicularly from the surface 305 of the emergent side 320. In this example, the incident ray 350 strikes the lens 300 from a direction that is perpendicular to the surface 305 of the emergent side 320 and parallel to the optical axis of the lens 300. The refractive index of air through which the incident ray 350 passes is "n1" and the refractive index of the lens material is "n2". "Ri" is the angle of refraction on the incident side 310 relative to the surface 302 of the side section 301 and can be calculated with Snell's Law of refraction as: n1 sin(I)=n2 sin(Ri). "Re" is the angle of the refracted ray 360 on the emergent side 320 relative to the surface 305 and can be calculated from Snell's Law as: n2 sin (Re)=n1 sin(E), where Re=A−Ri.

Radiation that is incident on the lens 300 is split by the lens 300 into "n" separate beams of radiation on the emergent face where "n" equals the number of side sections of the lens 300 and the radiation that passes through the center section 303 unrefracted. For the lens 100, shown in FIGS. 2 and 3, incident radiation incident is refracted as it passes through each side section 101, 102, 103, 104 and is emitted as four separate beams on the emergent side 120 of the lens 100 plus the beam of radiation that passes through the center section 105 unrefracted. For the lens 200 shown in FIGS. 4 and 5, each side section 201, 202, 203, 204, 205, 206 refracts an incident ray and produces a separate beam on the emergent side 220 of the lens 200 in addition to the beam that emerges from the center section 207.

Figure 7:
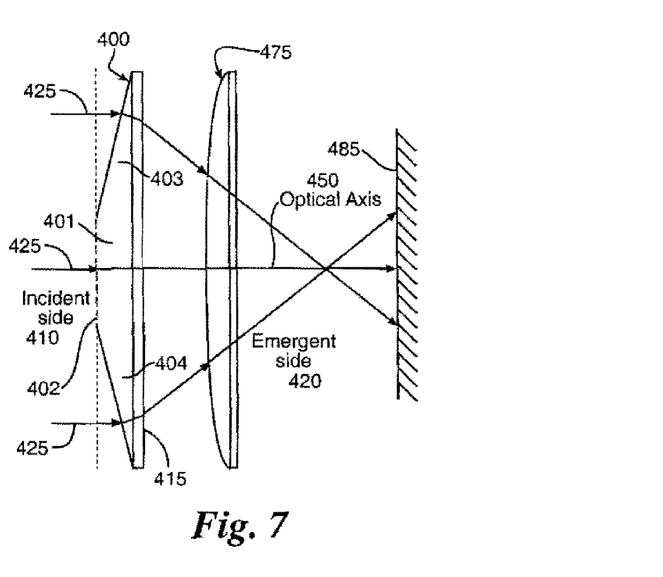
FIG. 7 shows radiation passing through a multi-spectral lens and a focusing lens to a focal plane.

As shown in FIG. 7, a multi-spectral system has an optical axis 450 that passes through the center section 401 of a multi-spectral lens 400. The optical axis 450 extends in a direction that is perpendicular to the surface 402 of the center section 401 and the surface 415 of the emergent side 420 of the lens 400. For the lens 400 shown in FIG. 7, the optical axis 450 provides rotational symmetry for the system. FIG. 7 traces the path of radiation 425 passing from the incident side 410 through the lens 400 and a focusing lens 475 to a focal plane 485. A distant radiation source behaves similar to a point source and the lens 400 produces "n" copies of radiation from the point source where "n" equals the number of side sections and the center section of the lens. Incident radiation 425 from the point source is refracted as it passes through the side sections of the lens 400, including side sections 403, 404 shown in FIG. 7. Incident radiation 425 passes through the center section 401 without being refracted along the optical axis 450. The incident radiation 425 is split into "n" beams that emerge from the lens 400 and pass through the focusing lens 475, which focuses the radiation 425 onto the focal plane 485. The beam from the center section 401 is focused on the center of the focal plane 485. Detectors, sensors, or other devices positioned on the focal plane 485 can detect and measure each beam of radiation as described in more detail below. Depending on the types of point events to be detected, the multi-spectral lens 400 and the focusing lens 475 are made of appropriate refractive material and coated with materials that refract and filter the appropriate wavelengths of radiation from the point event so different bands of the incident radiation 425 that are of interest in characterizing the point event are focused on the focal plane 485. If a particular spectra of radiation is not present in the incident radiation 425, then no beam of radiation emerges from that particular side section and that spectral band is not detected on the focal plane 485.

Figure 8:
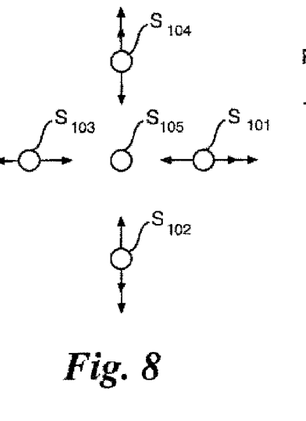
FIG. 8 is a spot diagram formed by radiation passing through the lens of FIG. 2.

FIG. 8 shows a spectral diagram of spectral bands that are formed on a focal plane by radiation that is emitted from a point source or point event and refracted by a multi-spectral lens, such as the lens 100 shown in FIGS. 2 and 3. The multi-spectral lens 100 splits the incident radiation from the point event into five separate bands or spots that are focused on the focal plane to form a spectral diagram of the point event. By using different filters and/or coatings on the side sections, each radiation band or spot of the spectral diagram corresponds to a particular spectrum of the incident radiation produced by the point event. The center section produces total radiation from the event unless it is coated to filter a particular radiation spectrum. The spectral diagram formed on the focal plane can be analyzed to characterize the event. In the case of the lens 100 shown in FIGS. 2 and 3, spot $S_{101}$ represents a radiation band refracted through the side section 101. Spot $S_{102}$ represents a radiation band that was refracted through the side section 102. Spot $S_{103}$ represents a radiation band that was refracted through the side section 103. Spot $S_{104}$ represents a radiation band that was refracted through the side section 104. Spot $S_{105}$ represents a radiation band that passed through the center section 105 unrefracted. In this example, the spots are reversed in relation to the positions of the side sections because the emergent radiation beams were focused across the optical axis of the lens (as shown for example in FIG. 7). By increasing or decreasing the angle of incline "A" of the side sections 101, 102, 103, 104 of the multi-spectral lens 100, the spectral bands or spots $S_{101}, S_{102}, S_{103}, S_{104}$, can be moved toward or away from the center spot $S_{105}$ and each other, as shown in FIG. 8. Reducing the angle of incline "A" moves the spots closer together and expands the field of view of the system. Increasing the angle of incline "A" moves the spots further apart on the focal plane and decreases the field of view of the system. In many cases, the angle of incline "A" is very slight so the filtered spectral bands from a point event $S_{101}, S_{102}, S_{103}, S_{104}$, are separated from the center spot and one another by only a pixel or two. This enables the spectral diagram of all the spectral bands $S_{101}, S_{102}, S_{103}, S_{104}$ and the center spot $S_{105}$ to be detected in a region of a detector that measures only several pixels by several pixels. This also greatly increases the field of view of the system. Depending on the particular radiation emitted by a point event, as well as the types of coatings and filters used on a lens, spectral bands or spots may not be emitted from all side sections and the spectral bands or spots that are detected on the focal plane may have different intensities. The presence or absence of particular spectral bands or spots, as well as the energy level of each detected spectral band or spot, all provide indications of the type of point event that occurred. The ease with which the multi-spectral system can be tailored for particular events and environments also enables the systems to be used in a wide variety of applications to provide rapid analysis and characterization of point events, including rapidly-occurring point events that other systems cannot detect or characterize. Examples of coatings that may be used to filter different spectra of incident radiation from a point event include multilayer thin film stacks that are designed to be either band pass, notch, narrow band, cut on, or cut off filters. An example of a common band pass filter would be a filter that passes radiation from one micron to five microns but will not pass radiation at any other wavelength. An example of a common notch filter would be a midwave (one to five microns) infrared band pass filter with the carbon dioxide absorption band (4.2 to 4.37 microns) blocked out. A common cut-on filter might be a semiconductor such as silicon which begins transmitting in the short wave infrared. An example of a cut-off filter would be a glass that transmits through the visible but turns off due to absorption in the short wave infrared.

Figure 9:
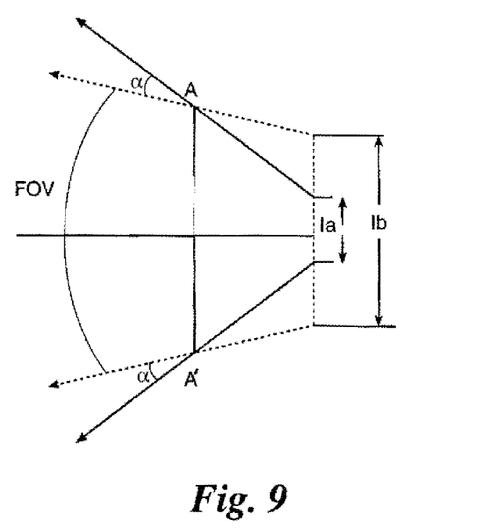
FIG. 9. shows a field of view arrangement.

The field of view (FOV) of the multi-spectral system is the range of angles over which incident radiation can be refracted and collected on a focal plane array (FPA) such as a focal plane or a detector. The size of the FOV affects the size of the image formed on the FPA. A FOV with wider angles produces smaller images on the FPA. In many optical systems, the FOV is determined by the focal length of the lens, and the size of the field stop, which prevents radiation beyond its dimensions from reaching the imaging surface. If the size of the field stop is reduced, the FOV is reduced accordingly. The location of the FPA in relation to the lens determines at what range objects are brought into focus. In the case of the multi-spectral system, a tighter grouping of spectral spots on the FPA enables a larger FOV without sacrificing the size of the optics in front of the focal plane. This also enables expansion of a narrow field of view without the introduction of a field stop, which is an additional optical element. This capability is particularly useful in dealing with a fielded device where modifications are restricted due to tactical size and/or weight requirements, or are cost prohibitive because the housing of the optical system must be modified. FIG. 9 shows how the size of objects on a FPA relates to FOV for two objects $I_a, I_b$. The aperture of the optical system is fixed and represented by opening AA'. The FOV is the angular distance between the two dotted lines drawn from the edge of either side of the larger object $I_b$ on the FPA. As object size decreases from $I_b$ to $I_a$, the light rays from the edges of the object $I_a$ to the edges of the aperture AA' increase the FOV by an angular distance of 2α. A similar effect can be achieved by changing the angle of incline "A" of the side sections of the disclosed lenses. As the angle of incline "A" decreases, the spectral spots or bands are refracted toward each other and the center spot on the focal plane/FPA. Thus, the FOV of a multi-spectral system can be increased or decreased, as desired, by changing the angle of incline "A" of the side sections of a multi-spectral lens. For a fixed optical system that is upgraded with the disclosed multi-spectral system, the FOV can be increased by decreasing the angle of incline "A" until all the refracted spectral bands fall within the focal plane of the system and can be detected. Because the multi-spectral system filters only spectra of interest measuring just a few pixels, retrofitting the system does not change the FOV of an existing system and only loses a small insignificant fraction of the information from the spectral mapping due to the edges while not requiring any additional optical components.

Figure 10:
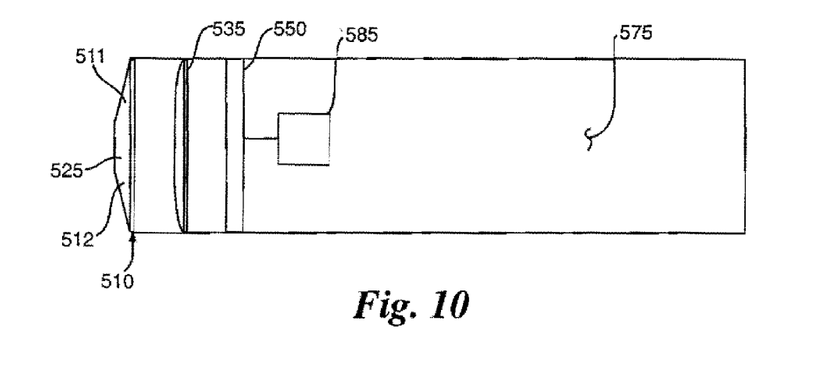
FIG. 10 is a cut-away view of a multi-spectral system mounted to another system.

These features make the disclosed multi-spectral systems and methods ideally-suited for modifying and upgrading optical systems of existing devices, as shown in FIG. 10. Such a multi-spectral system comprises a multi-spectral lens 510 with "n" side sections 511, 512, 51n, a center section 525, a focusing lens 535, and a detector 550. The system can be retrofitted or attached to an existing missile, sensor, or other device 575 to upgrade its optical system. For example, it can be used with early warning fire detectors for forestry applications or a spectrally sensitive satellite (or star) detector looking into space. The detector 550 is positioned on the focal plane of the system and comprises a detection region corresponding to the side sections and center section of the lens 510. The lens 510 splits incident radiation from a point event into "n" separate beams of radiation in particular spectra and the focusing lens 535 focuses the refracted beams onto the detection region of the detector 550. The side sections 511, 512, 51n are coated with different materials to filter different wavelengths of radiation from the radiation emitted by a point event. The detection region detects the presence of particular beams of radiation that pass through the side sections and center section of the lens 510. The detection region also detects the energy level and other characteristics of the spectral bands. If the emitted radiation incident on the multi-spectral lens 510 includes radiation within the spectra filtered by a side section, then that spectral band of radiation is refracted by that particular side section and is focused onto the detector 550. The center section 525 is generally uncoated to obtain the entire spectrum of radiation emitted by a point event. However, the center section 525 may be coated to obtain a particular spectral band of ration emitted from a point event. The spectral bands that emerge from the lens 510 and are focused by the focusing lens 535 form a spectral diagram of the point event at a particular moment in time and comprise one or more spectral bands or spots on the detector 550. If incident radiation does not include particular spectra of radiation, the detector 550 will not detect a radiation spot or band for those spectra. If radiation in particular spectra is filtered by the lens 510 and focused onto the focal plane or FPA, the detector 550 will detect a radiation spot or band for that spectra. If a point event did not emit any radiation in any of the filtered spectra of interest, the detector 550 will not detect any radiation spots and there will be no spectral diagram, or a null spectral diagram will be detected (apart from the radiation of the event that passes through the center section 525 of the lens 510 unfiltered).

The detector 550 is connected to a control unit 585 that comprises a processor, a computer readable medium with software and program instructions for sampling and processing the spectral bands and spectral diagram that form on the detector 550, and memory for storing data relating to sampled spectral bands and spectral diagrams, and stored spectral bands and spectral diagrams of known point events of interest. Because point events often involve rapidly-occurring and evolving energy profiles, the detector 550 is sampled at prescribed rates that are sufficiently frequent to detect the presence or absence of radiation spots in the particular spectral band. The energy level and other characteristics of each radiation band or spot may be measured. The processing software analyzes spectral band and spectral diagram information to characterize the point event. The processor can be any type of processing system. The computer readable medium can include one or more multi-spectral analysis algorithms for sampling and analyzing spectral bands and the overall spectral diagrams that form on the detector 550. The algorithms can be varied as desired to detect and characterize particular point events. The processor and software perform the analysis more efficiently than complex systems associated with multi-spectral imagers because they do not have to process large numbers of spectral bands or large pixel-intensive spectral images that multi- and hyper-spectral imagers typically process. Conventional multi-spectral imagers process hundreds of spectral bands of varying amplitude and spectral images comprising thousands of pixels of information and this process requires complex hardware and software and extensive processing time. Also the optical front end of the lens 510 and focusing lens 535 are designed for detection of rapidly evolving point targets and events that are comparatively small and rapid with respect to the total field of view of the multi-spectral system, so the algorithmic template matching of complex data sets is not required. Because the multi-spectral system produces a small, discrete number of radiation spots on the detector 550, the processor and software can rapidly process this greatly reduced data set at much greater frequencies and frame rates than imagers, thereby capturing all relevant spectral data emitted by a point event. A multi-spectral system with a multi-spectral lens shown in FIGS. 2 and 3 can detect radiation in four spectral bands of interest. A system with a multi-spectral lens such as that shown in FIGS. 4 and 5 can detect radiation in six spectral bands. An additional band can be detected by each lens if the center section is used to filter radiation instead of capture total radiation for a point event. Each spectral band of interest is selected based on threat characterization and calculations, and measurements of known point events. This data is stored in the control unit 585 for comparison with spectral diagrams and spectral bands detected on the detector 550. Sensors like the cross dispersion prism imager disclosed in U.S. Pat. No. 7,155,354 and the multi-band direct vision prism disclosed in U.S. Pat. No. 6,935,757 can be used to collect, verify, and/or validate analytical data and identify spectral bands of interest for particular point events. To detect and identify an energetic event from its initiation, the system can effectively use the temporal evolution of the event together with the spectral features of the different selected bands incorporated in the system. Each class of event produces a distinctive spectral/temporal fingerprint that can uniquely identify a detected event. Each spectral color amplitude is plotted (side-by-side) as a function of time. A library template is then used to match the event (as detected by the multi-spectral system) against a known potential source. The library is established by careful measurement of many events under different circumstances.

Because the optical front ends of the disclosed multi-spectral systems produce a reduced data set by filtering for pre-determined spectral bands, they maximize system response time to a specific threat stimulus for a given spectrum for detection and they are more isolated from noise and natural artifacts that may corrupt the spectral signature of interest. The multi-spectral processor algorithm and software correlates the characterization data set to the system response to determine if a particular point event qualifies as point threat. The reduced data set produced by the system requires less processing capacity, which translates to reduced hardware and processing requirements and shorter processing time. The software algorithm will focus on rapidly changing point anomalies in its field of view. The reduced spectral data set produced by the system can be analyzed by the software algorithm in a quick "n" by "n" pixel filter format to identify energy variations in spectral bands of interest within a spectral diagram. For higher or lower resolution, the "n by n" filter can be replace by an "m by m" filter where "m" can be a less than or greater than "n". This can provide information such as friend or foe, or temperature of the event from the energy in spectral bands. The algorithm can assign weights to each spectral point source present in the spectral diagram so that a threat is detected for example only when all five bands appear with the same energy level. This feature reduces false alarms. The reduced data set also permits use of much higher sampling rates thereby ensuring that a more complete range of spectral diagrams and information are detected, sampled, and analyzed for each point event to accurately characterize the point event.

The multi-spectral system also processes multi-spectral radiation data to obtain a "running average" or a "moving average" of the values of spectral bands over a prescribed number of frames. A processing algorithm calculates and maintains weighted and unweighted averages concurrently with detecting and processing each frame of spectral data at various sampling rates. For example, an unweighted mean would simply add a predetermined number of frames and divide them by the total to produce a simple mean. The number of frames in an average can be varied based on the size of the spectral diagram, processing hardware, and time constraints associated with particular point events. This processing can smooth out minor fluctuations and provide a more precise estimation of energies in the field of view. If a rapidly-changing point event occurs in the field of view, a spike in the energy in one or more spectral bands of interest will be detected and enable the processing algorithm to characterize the event as a true threat or a false alarm. If a user wants to increase the sensitivity of the system by decreasing the detection threshold, the running average also helps to reduce the false alarm rates by smoothing out minor energy variations in the field of view. A weighted sum can be used to assign priority to certain spectral bands over others by assigning multiplication factors or weights to some bands. For example, if bands 2 and 3 are expected to have more energy for a particular type of event, the algorithm can assign each band a weight of 0.5. If the detected spectral diagram displays equal amounts of energy in all spectral bands, the algorithm will reduce the second and third band by the assigned weights and the processor will show reduced energy levels in the second and third bands, thereby signifying the absence of the particular event. However, if after the weighting of the spectral bands, the energy distribution is same for all bands, the processing algorithm would determine that there was an increase of a factor of two in the energy level of the bands of interest and therefore the likelihood of the occurrence of a particular event. Thus, by increasing or decreasing the weighting of some or all spectral bands, the system can define threshold energy levels for identification of particular threats. The algorithm can run multiple analyses of spectral bands detected in a frame by weighting one or more spectral bands with different weights for each particular analysis to detect and differentiate multiple events with different energy signatures. The reduced data set produced by the multi-spectral system 500 permits multiple analyses to be performed on spectral data detected for each frame and this enables the system to more precisely identify particular point events and reduce false alarms.

Figure 11:
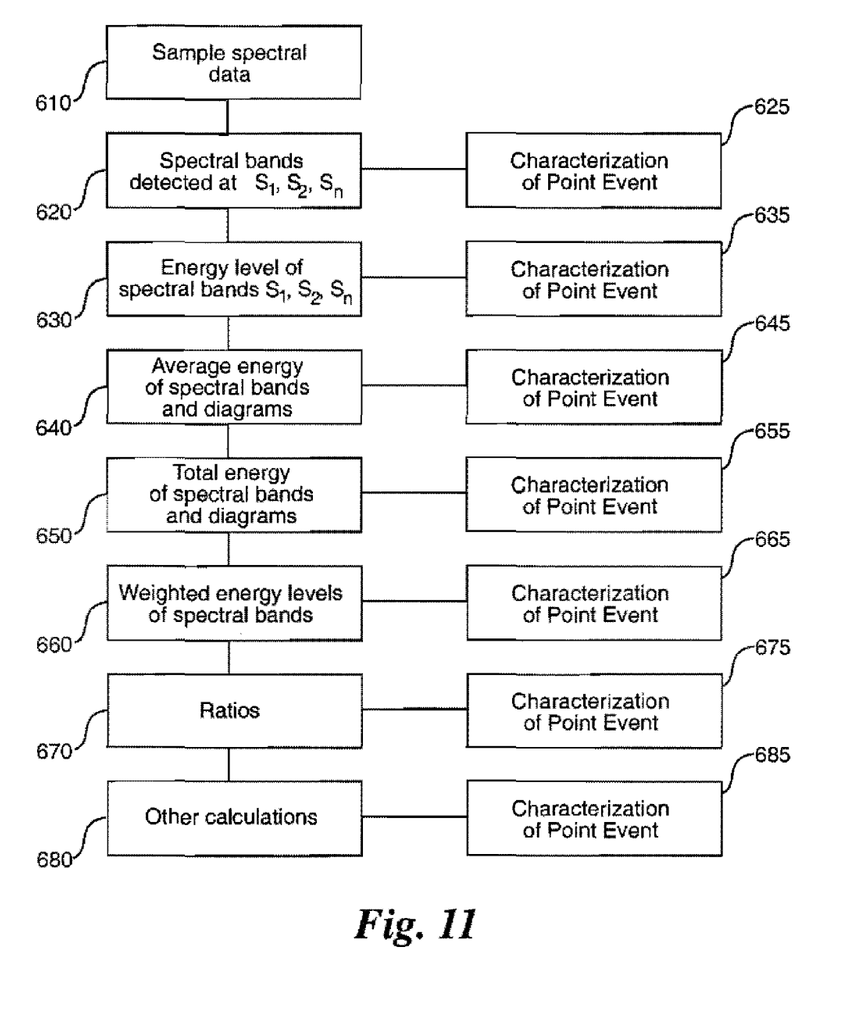
FIG. 11 is a flow chart illustrating one method of processing spectral bands of a point event.

As shown in the flow chart in FIG. 11, the multi-spectral system software and processing algorithm samples spectral data from the detector 610 at a prescribed frame rate. The frame rate or sampling rate can be varied depending on the point events to be detected and the environment. The spectral data comprises radiation spots or bands in particular spectra that are filtered by a multi-spectral lens, as previously described, to form a spectral diagram of the event on the detector. The detector detects a spectral diagram formed by the bands of filtered radiation that pass through the lens. The spectral diagram detected at 620 is a composite of the particular spectra or bands of radiation that are present in the incident radiation from a point event. For an unfiltered center section, the spectral diagram could include a spot corresponding to the total energy of the point event. Depending upon the spectral diagrams detected in each frame, the processing algorithm may make a preliminary characterization of the point event 625. For example, a particular point event may produce radiation in a particular band such as the third band and no other bands. Detection of a spectral diagram with only the third band at step 620 would lead to preliminary characterization of the point event in step 625 as that type of event. The processing algorithm also measures energy levels and other characteristics of each spectral band in the spectral diagram and of the composite spectral diagram 630 and these measurements can be used to characterize or provide confirmation of the point event 635. The energy levels of individual spectral bands and the spectral diagram can be used to identify a particular point event according to predetermined criteria 635. For example, detection of a large energy level for the third band can provide confirmation of a particular event. The processing algorithm makes these calculations at step 635 based on detected energy levels of each spectral band and/or of the spectral diagram 630 and a comparison of those values to stored spectral data for known point events. The average energy level of each spectral band and/or the spectral diagram can be taken over "n" frames to provide a rolling average and the number of frames can be varied depending on the particular event(s) to be detected 640. If a certain number of frames correspond to the time expected of a particular event, the rolling average can provide an average energy level for the event from initial detection. These average energy levels can be used to characterize or confirm characterization of a point event 645. The processing algorithm also can calculate a total energy level for one or more spectral bands or a spectral diagram sampled over "n" frames where "n" can correspond to a time period associated with a particular event or another period of time 650. The processing algorithm can use the total energy levels to characterize or confirm characterization of a particular event 655. The processing algorithm also can weight one or more of the spectral bands of a spectral diagram 660. Weighting spectral bands provides additional means for confirming or excluding detection of particular events and removing background noise and energy 665. The processing algorithm can calculate ratios of any of the foregoing spectral bands and calculations such as the energy levels of one or more detected spectral bands or the total energy detected for an event and/or all detected bands of a spectral diagram 670 and these ratios can be used to confirm or exclude identification of point events 675. For example, spectral band energy levels detected at step 630 can be compared to one another or to the total energy level of all spectral bands or the point event itself in the case of a center section that is unfiltered to provide ratios based on the total energy of a point event. The algorithm can perform other calculations, as desired, based on the spectral bands and spectral diagrams detected 680 and use those calculations to characterize point events 685. The processing algorithm may perform one or more of the steps and calculations disclosed in FIG. 11 for a given point event and may do so in any order depending on the environment and point event(s) to be detected. For example, in the case of a point event known to generate radiation in four spectral bands and a particular overall energy in a particular time period, the lens can be configured to detect radiation in the four spectral bands of interest by applying coatings or other means to four side sections so they filter those four spectral bands and refract them onto the detector. The center section can provide an unfiltered reading of the energy of the point event or environment in the field of view. The processing algorithm samples the spectral diagrams formed at the detector at step 610 at a frame rate prescribed for that type of event. If the four relevant spectral bands are detected at step 620, the algorithm can make a preliminary characterization of the event 625. By also determining the energy levels of each spectral band at step 630 and comparing the energy levels to the total energy detected from the event at the center section at step 650, the software can confirm the point event as a particular type. Calculation of weighted energy levels at step 660 or total energy over "n" frames at step 650 can provide further confirmation of a point event at characterization steps 665 and/or 655, respectively. The speed at which the system produces spectral diagrams of point events and samples stored spectral diagrams of known point events and the reduced and simplified spectral diagram data set produced by the multi-spectral system enable rapid detection and analysis of point events enable reliable detection and characterization of rapid point events.

Depending on the desired application, the disclosed multi-spectral system can be constructed to detect radiation from a wide variety of point events and for all types of ionizing and non-ionizing radiation across the full spectrum of wavelengths, frequencies, and energies. Different materials may be used for the lenses to provide the proper refractive properties for the particular radiation anticipated and field of view and other desired characteristics. The disclosed devices are easy to install and retrofit on existing imaging systems and sensors and therefore provide a reliable, low-cost way to detect point source events across a broad spectrum.

The foregoing disclosure has been presented for purposes of illustration and description and is not intended to be exhaustive or to limit the disclosure and the inventions disclosed therein to the various embodiments and forms disclosed herein. Persons skilled in the art will realize and appreciate that many modifications and variations are possible in light of the above teaching. The disclosed embodiments chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A multi-spectral system for detecting a point event comprising:
   a multi-faceted lens having an incident side and an emergent side, the incident side including a center section and at least two side sections, wherein each side section is coated with a material to filter a particular spectra of radiation from radiation emitted by a point event and received at the incident side of the multi-faceted lens;
   a focusing lens disposed on an optical axis extending from the emergent side of the multi-faceted lens to focus the filtered radiation emerging from the emergent side of the multi-faceted lens onto a focal plane;
   a detector positioned at the focal plane and configured to detect the filtered emerging focused radiation; and
   a control unit including:
      a processing system;
      a memory; and
      processing software resident in the memory,
         wherein the control unit is connected to and controls the detector to sample the filtered emerging focused radiation in a detection region at a prescribed frame rate to create a spectral diagram of the point event for each frame.

2. The system of claim 1, wherein the processing system executes the processing software to perform computer executable instructions selected from a group consisting of: sample the detection region at prescribed frame rates, detect the presence of different spectral bands of radiation in the detection region, measure the energy level of each spectral band of radiation detected in the detection region, calculate a total and an average energy level for each spectral band of radiation and each spectral diagram over "n" sampled frames, calculate a total energy level for each spectral diagram in a frame, calculate weighted energy levels of each spectral band of radiation detected in the detection region and use those calculations to determine average and total energy levels of each spectral band of radiation and spectral diagrams over "n" sampled frames, compare one or more of the foregoing calculations to known spectral diagrams and spectral data of known point events to characterize the point event that produced the radiation, and combinations thereof.

3. The system of claim 1, wherein the coating material comprises a multilayer thin film stack, a band pass filter, a notch filter, a cut on filter, or a cut off filter.

4. The system of claim 1, wherein the multi-faceted lens further comprises:
   up to twenty side sections,
      wherein each of the side sections has an angle of incidence with respect to the center section which may be different with respect to other side sections,
   wherein each side section is coated with a different material to filter a particular spectra of radiation, and
   further wherein the center section is coated with a material to filter a particular spectra of radiation.

5. The system of claim 1, wherein the system can be mounted or retrofitted to a missile, sensor, or other device.

6. The system of claim 1, wherein the memory contains spectral diagrams, spectral bands, and other data corresponding to known point events and the processing software performs various calculations with the spectral diagrams and the radiation that was detected in each detection region over one or more sampled frames and characterizes the point event based on that comparison.

7. The system of claim 1, wherein each of the side sections is disposed at a particular angle of incidence with respect to the center section and each of the angles of incidence of each side section may vary with respect to one another to alter the field of view of the system.

8. A method of characterizing a multi-spectral event comprising the steps of:
   detecting radiation from a multi-spectral event with a multi-faceted lens that produces "n" copies of the radiation where "n" corresponds to a number of side sections and a center section of the multi-faceted lens;

filtering different spectra of radiation through each side section;

focusing the different spectra of radiation on a focal plane to form a spectral diagram of the different spectra of radiation;

sampling the spectral diagram and the different spectra of radiation; and comparing the sampled spectral diagram and spectral radiation to spectral diagrams and spectral data of known point events to characterize the point event.

9. The method of claim 8, wherein the step of filtering different spectra of radiation on the focal plane comprises filtering the different spectra of radiation with a multilayer thin film stack, a band pass filter, a notch filter, a cut on filter, and/or a cut off filter that are placed on an incident side of each side section.

10. The method of claim 8, wherein the step of filtering different spectra of radiation through each side section comprises coating each side section with a different material that filters a particular spectra of radiation according to the type or types of point events to be detected.

11. The method of claim 8, wherein the step of sampling the spectral diagram and each spectra of radiation in the spectral diagram comprises determining whether radiation is present in each spectra of the spectral diagram and performing one or more of the following calculations: measuring the energy level of each spectra of radiation that is detected, calculating an average energy level for spectra of radiation and each spectral diagram over "n" sampled frames, calculating a total energy level for each spectra of radiation and each spectral diagram over "n" sampled frames, calculating average and total energy levels for each spectra of radiation and each spectral diagram based on one or more weighted values, calculating ratios of one or more of the detected spectra of radiation and the spectral diagram, and performing other calculations, as needed to identify the point event.

12. The method of claim 8, wherein the step of comparing the sampled spectral diagram and spectral radiation to spectral diagrams and spectral data of known point events comprises one or more of comparing the energy level of each spectral diagrams and spectra of radiation to spectral diagrams and spectral data of known point events, comparing the total and average energy level of spectral diagrams and spectral radiation sampled over "n" frames to total and average energy levels of spectral diagrams and spectra data of known point events, and comparing weighted total and average energy levels of spectral diagrams and spectral radiation sampled over "n" frames to spectral diagrams and spectra data of known point events.

13. The method of claim 8, wherein the step of detecting radiation from a multi-spectral event with a multi-faceted lens comprises using a multi-faceted lens having from two to twenty side sections and further wherein an angle of incline of each of the side sections may vary with respect to one another to alter the field of view of the multi-faceted lens.

14. The system of claim 1, wherein the center section is coated with a material to filter a particular spectra of radiation from radiation emitted by the point event and received at the incident side of the multi-faceted lens.

* * * * *